US012430449B2

(12) United States Patent
George et al.

(10) Patent No.: US 12,430,449 B2
(45) Date of Patent: Sep. 30, 2025

(54) SYSTEMS AND METHODS FOR HIDING RESPONSE VOLUME WITH ENCRYPTED MULTI-MAPS

(71) Applicant: MongoDB, Inc., New York, NY (US)

(72) Inventors: Marilyn George, Brooklyn, NY (US); Seny Kamara, New York, NY (US); Tarik Moataz, Brooklyn, NY (US)

(73) Assignee: MongoDB, Inc., New York, NY (US)

( * ) Notice: Subject to any disclaimer, the term of this patent is extended or adjusted under 35 U.S.C. 154(b) by 329 days.

(21) Appl. No.: 18/075,873

(22) Filed: Dec. 6, 2022

(65) Prior Publication Data

US 2023/0177177 A1  Jun. 8, 2023

Related U.S. Application Data

(60) Provisional application No. 63/286,919, filed on Dec. 7, 2021.

(51) Int. Cl.
*G06F 21/00* (2013.01)
*G06F 16/2455* (2019.01)
(Continued)

(52) U.S. Cl.
CPC ........ *G06F 21/602* (2013.01); *G06F 16/2455* (2019.01); *G06F 16/258* (2019.01)

(58) Field of Classification Search
CPC ... G06F 16/2455; G06F 16/258; G06F 21/602
See application file for complete search history.

(56) References Cited

U.S. PATENT DOCUMENTS 11,269,824 B1\*  3/2022  Waas ................. G06F 16/2448
2020/0285777 A1  9/2020  Heller et al.
(Continued)

OTHER PUBLICATIONS

Wang et al., Simple Storage-Saving Structure for Volume-Hiding Encrypted Multi-Maps (A Slot in Need is a Slot Indeed). International Federation for Information Processing. Jul. 2021. pp. 63-83.\*
(Continued)

*Primary Examiner* — Jeffrey C Pwu
*Assistant Examiner* — Thong P Truong
(74) *Attorney, Agent, or Firm* — Wolf, Greenfield & Sacks, P.C.

(57) ABSTRACT

A volume hiding structured encryption system and method is provided. According to some embodiments, the system leverages the principle that a STE scheme can leak cumulative information about the query volumes of the data stored in multi-map format, while still hiding the volumes of client queries at query time. According to various examples, the system implements encryption schemes that have smaller storage and better query complexity than the current state-of-the-art, for some input distributions. According to one example, the STE schemes are adapted to the input data structure in order to improve efficiency over known approaches. Further examples includes schemes that are configured to partition a multi-map into smaller multi-maps, and use different allocation functions for different efficiency trade-offs: (i) random allocation, (ii) cuckoo-hashing allocation, and (iii) Garbled Bloom Filter allocation. In one example, the GBF construct enables a stash-less encryption scheme that hides query volumes.

20 Claims, 5 Drawing Sheets

(51) Int. Cl.
*G06F 16/25* (2019.01)
*G06F 21/60* (2013.01)

(56) References Cited

U.S. PATENT DOCUMENTS

| 2022/0207171 A1 | 6/2022 | Moataz |
| 2022/0215115 A1 | 7/2022 | Moataz |
| 2023/0315896 A1 | 10/2023 | Karama et al. |
| 2023/0315897 A1 | 10/2023 | Karama et al. |
| 2023/0325524 A1 | 10/2023 | Kamara et al. |

OTHER PUBLICATIONS

Amjad et al., Dynamic Volume-Hiding Encrypted Multi-Maps with Applications to Searchable Encryption. Google. Jun. 10, 2021. 31 pages.

Kamara et al., Computationally Volume-Hiding Structure Encryption. International Conference on the Theory and Application of Cryptographic Techniques. May 19, 2019. 30 pages.

Patel et al., Mitigating Leakage in Secure Cloud-Hosted Data Structures: Volume-Hiding for Multi-Maps via Hashing. ACM SIGSAC Conference. Nov. 2019. 26 pages.

Wang et al., Simple Storage-Saving Structure for vol. Hiding Encrypted Multi-Maps (A Slot in Need is a Slot Indeed). International Federation for Information Processing. Jul. 2021. pp. 63-83.

Wang et al., Practical Volume-Hiding Encrypted Multi-Maps with Optimal Overhead and Beyond. Association for Computing Machinery. Nov. 7, 2022. 2825-2839.

Wong et al., Secure query processing with data interoperability in a cloud database environment. In Proceedings of the 2014 ACM SIGMOD international conference on Management of data. 1395-1406.

* cited by examiner

SYSTEMS AND METHODS FOR HIDING RESPONSE VOLUME WITH ENCRYPTED MULTI-MAPS

RELATED APPLICATIONS

This Application claims priority under 35 U.S.C. § 119(e) to U.S. Application Ser. No. 63/286,919, filed Dec. 7, 2021, entitled "SYSTEMS AND METHODS FOR HIDING RESPONSE VOLUME WITH ENCRYPTED MULTI-MAPS" which is herein incorporated by reference in its entirety.

BACKGROUND

Implementing end-to-end encryption poses many challenges in the data management and database spaces. The goal of such encryption approaches is to provide a completely secure set of data for client, irrespective of platform. Even when data is fully encrypted, there are opportunities for adversaries to exploit data leakage to learn about underlying encrypted data.

SUMMARY

According to some aspects, provided are systems and methods that implement end to end encryption, and provide implementation configured to hide the volume of individual queries being executed. Hiding the volume of individual queries can prevent an adversary from learning damaging information, even in environments or architectures where there is data leakage. For example, various aspects described below are configured to hide query volume even with leakage of the distribution of the data or leakage of the shape of the underlying data structure (e.g., multi-map) input into the encryption scheme. According to some embodiments, even if a database provider operates as an adversary, use of the encryption schemes and constructions described below are configured to hide the volume of individual queries to an encrypted multi-map. In various embodiments, encrypted multi-maps are employed to secure underlying data and ensure end to end encryption. Further embodiments, transform multi-map data structures into multiple multi-map data structures that can be encrypted and queried while hiding query volume. In various environments, the result of such encryptions means even system hosts (e.g., cloud compute providers, database providers, etc.) are prevented from accessing underlying plaintext data or learning damaging information outside of known leakage profiles, even during operations performed on their systems.

According to various embodiments, structured encryption (STE) is a cryptographic primitive that allows a client to outsource an encrypted data structure to an untrusted server. STE allows the system to run efficient queries on the encrypted data structure without having to decrypt or download the entire data structure. Every efficient STE scheme reveals some information about the data structure and queries to the (untrusted) server. This information is referred to as the leakage of the STE scheme. This leakage can potentially allow an adversarial server to infer details about the data and the queries that the client runs. Leakage suppression is a line of development that studies efficient techniques to hide (or suppress) common leakage patterns in STE schemes. Leakage suppression also studies the trade-offs in efficiency, security and functionality resulting from the use of STE techniques.

Various embodiments leverage the observation that complete and total hiding of information is not required to remain secure. For example, STE schemes need not hide the volume of the queries entirely. Instead, a scheme could reveal some cumulative statistics about the query volumes, for example, the maximum and minimum query volumes, while still hiding the volume of any individual query and remaining secure. Embodiments described herein hide the volume of individual queries to an encrypted multi-map while leaking the 'shape' of the input multi-map. The examples discussed in greater detail below transform an input multi-map into two multi-maps: (1) a 'rectangular' multi-map ("MM1") such that stored tuples in the rectangular MM1 have the same length, and (2) a second multi-map ("MM2") which holds any remaining values from the input multi-map. In various embodiments, these approaches lead to improvements both in storage and query complexity over existing volume-hiding schemes.

According to one aspect, a volume hiding encryption system is provided. The system comprises at least one processor operatively connected to a memory, the at least one processor when executing configured to: execute setup operations on an input multi-map data structure; transform the input multi-map data structure into at least two multi-map data structures as part of the setup operations; encrypt the at least two multi-map data structures; store the encrypted form of the at least two multi-map data structures for executing queries; and execute queries on the encrypted form of the at least two multi-map data structures, wherein execution of each query reads a fixed number of encrypted values irrespective of a length of a tuple stored in the input multi-map.

According to one embodiment, the operation to transform includes an operation to generate a minimum number of encrypted values based on at least a minimum length of a tuple in the input multi-map. According to one embodiment, the operation to transform the input multi-map data structure into at least two multi-map data structures as part of the setup operations includes operation to build a first multi-map storing a first set of values from every tuple in the input multi-map for tuple values up to a minimum response length. According to one embodiment, the at least one processor is configured to construct a second multi-map storing tuple values for tuples exceeding a minimum response length.

According to one embodiment, the at least one processor is configured to assign storage locations in the second multi-map based on logarithmic choice for the storage location. According to one embodiment, the at least one processor is configured to assign dummy values to any empty storage locations in the second multi-map. According to one embodiment, the at least one processor is configured to store any excess values in a stash repository. According to one embodiment, the at least one processor is configured to generate an encrypted dictionary storing the storage location labels and contents. According to one embodiment, a first one of the at least two multi-map data structures is constructed based on a consistent size tuple, and the second one of the at least two multi-map data structures is constructed to include at least some values that store data exceeding the consistent size of the first multi-map data structure. According to one embodiment, the at least one processor is configured to execute queries to include at least operations to: retrieve encrypted values from the first one of the at least two multi-map data structures; obscure a volume associated with a client query based on retrieving encrypted values from an encrypted dictionary needed to reconstruct a plaintext query response at the client. According to one embodiment, the at least one processor is configured to store the encrypted form of the at least two multi-map data structures for executing queries without requiring a stash for excess values.

According to one aspect, a computer implemented method for volume hiding encryption is provided. The method comprises executing, by the at least one processor, setup operations on an input multi-map data structure; transforming, by the at least one processor, the input multi-map data structure into at least two multi-map data structures as part of the setup operations; encrypting, by the at least one processor, the at least two multi-map data structures; storing, by the at least one processor, the encrypted form of the at least two multi-map data structures for executing queries; and executing, by the at least one processor, queries on the encrypted form of the at least two multi-map data structures, wherein the act of executing for each query reads a minimum number of encrypted values irrespective of a length of a tuple stored in the input multi-map.

According to one embodiment, transforming includes generating a minimum number of encrypted values based on at least a total number of values in the input multi-map. According to one embodiment, transforming includes generating a minimum number of encrypted values based on at least a maximum length of a tuple in the input multi-map. According to one embodiment, transforming includes generating a minimum number of encrypted values based on at least a minimum length of a tuple in the input multi-map. According to one embodiment, transforming the input multi-map data structure into at least two multi-map data structures as part of the setup operations includes generating a first multi-map storing a first set of values from every tuple in the input multi-map for tuple values up to a minimum response length.

According to one embodiment, transforming includes generating a second multi-map storing tuple values for tuples exceeding a minimum response length. According to one embodiment, generating the second multi-map includes assigning storage locations in the second multi-map based on logarithmic choice for the storage location.

Still other aspects, examples, and advantages of these exemplary aspects and examples, are discussed in detail below. Moreover, it is to be understood that both the foregoing information and the following detailed description are merely illustrative examples of various aspects and examples and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF THE FIGURES

Various aspects of at least one embodiment are discussed herein with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. In the figures:

DETAILED DESCRIPTION

Various embodiments disclosed describe architectures including multi-map data structures and tailored query algorithms so that query execution on encrypted data occurs in a volume-hiding fashion, even under leakage profiles that include data leakage of the distribution of the data or the shape of the input multi-map. Various embodiments are configured to transform an input multi-map data structure into two multi-maps where the first 'rectangular' multi-map structure tuple has the same length, and a second multi-map which holds any remaining values from the input multi-map. Query algorithms are then tailored to the multi-map constructs and to request information so that the query algorithm does not reveal the query volume, and leaks only some information.

Stated broadly, various embodiments are configured to hide the volume leakage of an encrypted data structure. The volume, or the number of results returned by a query, is revealed by many efficient STE schemes, and the volume is correlated with other leakage patterns. For example, there have been attacks formulated that use the volume leakage to infer the underlying data and queries. Additionally, when STE schemes are used to build larger, more complicated encrypted systems, the volume leakage reveals more information about the underlying data, and its correlation with other leakage patterns becomes crucial. Finally, hiding the volume leakage efficiently is also technically difficult, and therefore efficient volume-hiding techniques are crucial to designing complex encrypted systems with reduced leakage.

As discussed, encryption schemes can still effectively conceal query volume (does not reveal underlying information beyond permitted leakage) even where the volume is not completely hidden (e.g., from the server). Instead, a scheme could reveal some cumulative statistics about the query volumes, for e.g., the maximum and minimum query volumes, while still hiding the volume of any individual query. Various implementations hide the volume of individual queries to an encrypted multi-map while permitting leaking of the 'shape' of the input multi-map and remain secure. "Shape" in this context refers to the lengths of the tuples in the multi-map. For example, the schemes transform an input multi-map into two multi-maps: (1) an MM with consistent length tuple, and (2) a second MM which holds any remaining values from the input multi-map. By permitting some leakage (e.g., of shape) while preserving hidden properties of individual queries, the various examples yield improvements both in storage and query complexity over existing volume-hiding schemes.

Figure 1:
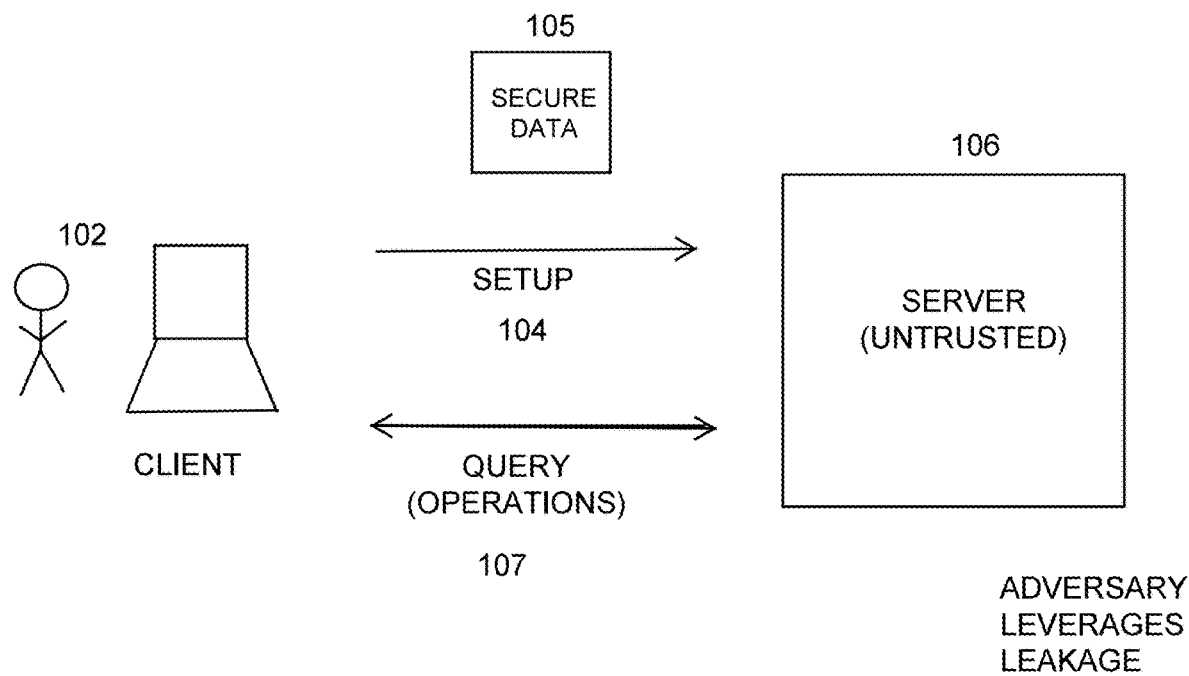
FIG. 1 shows an example construction, according to some embodiments.

FIG. 1 is a block diagram of a system configured to hide volume information during query execution. Shown in FIG. 1 is a client system 102 where plain text information is available. The client 102 performs some setup operations 104 (discussed in greater detail below) to enable queries 107 on secure data 105 stored at an untrusted server 106. To ensure security, the architecture assumes that the server may be an adversary attempting to learn information about the secure data 105 or derivable from encrypted responses obtained from a server hosting encrypted client data. Assuming that the server is an adversary, the server as the host of the secure data has the opportunity to learn information at setup and during queries on the secure data. Thus, in order to be secure, the encryption scheme and query algorithm should account for any data leakage. For example, there are known attacks that are based on leakage of query volume. In some embodiments, the data constructs and query algorithms eliminate this vulnerability.

Example Implementation

Figure 2:
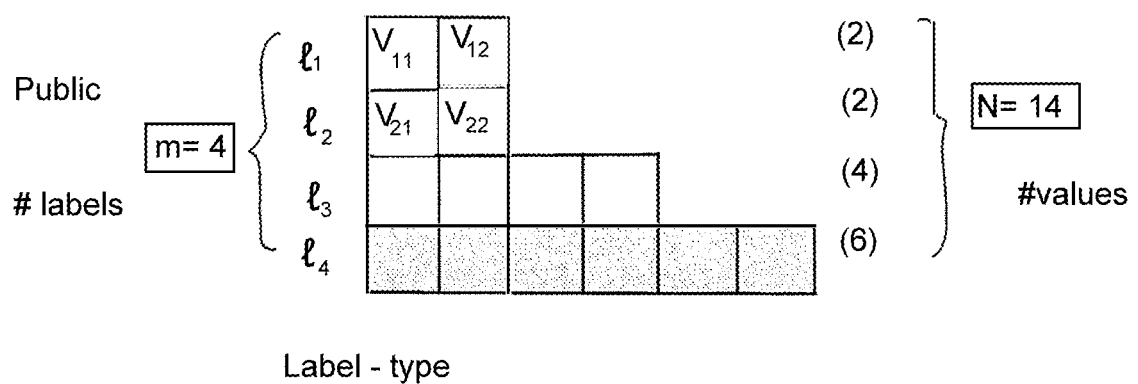
FIG. 2 is a block diagram of an example implementation & architectural design.

To facilitate understanding of various embodiments the input to an encryption scheme is a multi-map MM containing the set of labels L={1, 2, . . . , m} such that each label l corresponds to a tuple of values MM(i). Further, let the total number of values in the multi-map be N, the maximum length of a tuple be t, and the minimum length of a tuple be s. FIG. 2 is an illustration of a multi-map data structure comprising labels and values.

Example Construction: Log Choices

According to one embodiment, as part of setup, the system creates a rectangular multi-map MM1 by collecting the first s values from every tuple in the input MM. Since s is the minimum response length, every label in MM will also be present in MM1. Any remaining labels and values will be added to the second multi-map MM2. Various embodiments can implement logarithmic choices to enable volume-hiding. In one embodiment, the system defines the set of labels L' in MM2 as those which have tuples of length strictly greater than the minimum tuple length. Let m' be the number of labels in L' and N'=N (m−s) be the number of values stored in the second multi-map. Further, let the maximum tuple length of MM2 be t'=t−s. To confirm the volume hiding property, initialize the following balls-and-bins experiment:

Initialize N' bins and N' balls, each ball representing a value in MM2, and each bin with the capacity to hold exactly 1 ball (value).

Let f be an idealized random function that selects log N' bins at random for each value in a tuple. Then $f:L' \times [t!] \rightarrow [N']^{\log N'}$.

For each label l, for each value in the tuple MM2(l), choose log N' bins using the function f. If any of the chosen bins are empty, add the value to the bin. If all the bins are full, add the value to a stash (the client stores any values pushed to the stash during setup)

After completing the bin selection for every value, the system adds a 'dummy' ball to fill any remaining empty bins. Every bin now contains 1 ball. Next, the system adds the bin labels and contents to a dictionary DX.

Let $\Sigma_{MM}^{RH}$, $\Sigma_{DX}^{RH}$ be the response-hiding encrypted multi-map and dictionary schemes, respectively. Encrypt the multi-map MM1 yielding EMM1 and the dictionary DX yielding EDX and output EDS=(EMM1, EDX). According to some embodiments, the client stores any values that are pushed to the stash during the setup and uploads EDS to the server.

In further embodiments, queries are performed as follows: at query time, for any label l, a client first queries EMM1 to retrieve s values. It then uses the random function f (l, i), for i ∈ [t'] to query t'*log N' bins from the encrypted dictionary EDX. Finally, the system checks the local stash for any values. Then the client decrypts the bins, and combines them with the values from the stash to retrieve the complete tuple. Regardless of the length of the tuple MM(l), the query algorithm always reads (s+t'·log N') encrypted values. The inventors note that the size of EDX could reveal some information about the distribution of the tuple lengths in the input data. This data source is considered as part of the leakage profile. However, in various embodiments, for any label queried, the server only sees one query to EMM1 followed by the (t'*log N') queries to EDX. In this context, the locations read from EDX are distributed according to the ideal random function f(·). Thus, under this approach the query algorithm does not reveal the volumes of individual queries. In further example, the client's stash is not visible to the server. Thus, under the above approach the query algorithm does not reveal the volumes of the queries made by the client.

Figure 5:
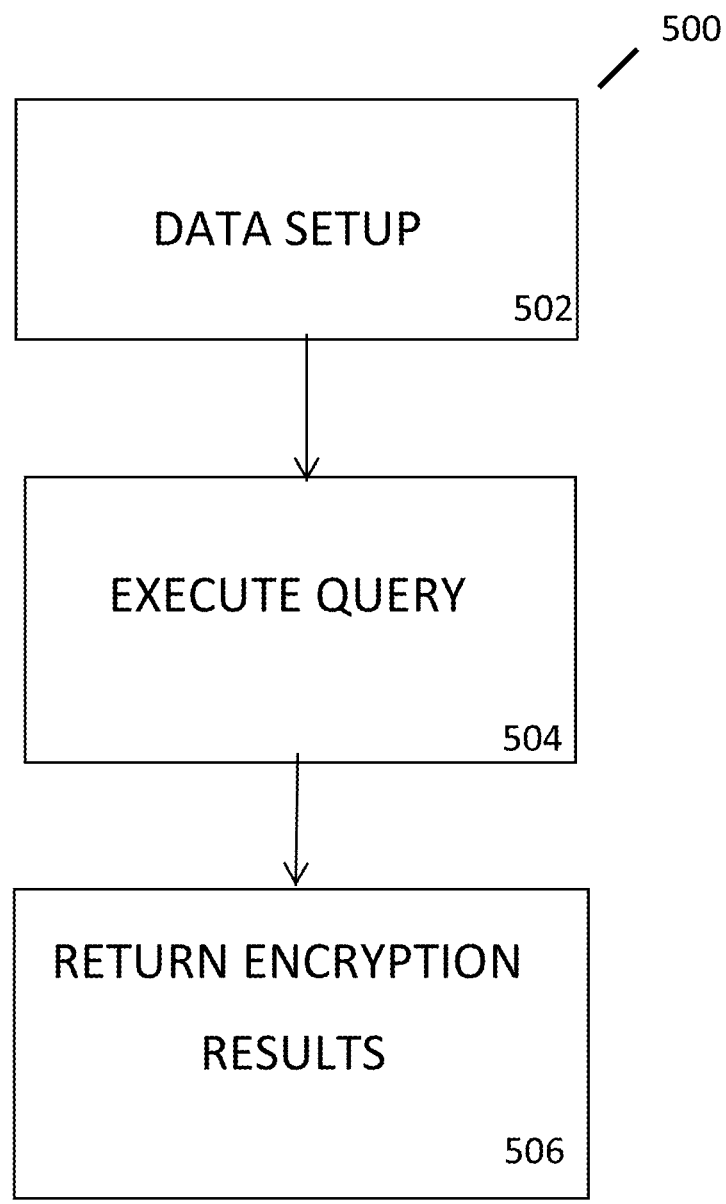
FIG. 5 is an example process flow according to one embodiment.

FIG. 5 illustrates an example process flow 500 that begins with the data set up steps discussed above, continues with the functions discussed for query time at 504, and provides an encrypted result at 506 that maintains the volume hiding properties.

Example Construction: Cuckoo Hashing

According to one embodiment, as part of setup, the system creates a multi-map MM1 as described above for the Log Choice construction. For the multi-map MM2, the system employs use of cuckoo hashing to reduce the size of the stash on the client side. In some of the cuckoo hashing examples, the system uses an existing technique called cuckoo hashing in order to improve the allocation of the values in MM2—where a response-hiding encrypted data structure hides the results of any query from the server.

Stated broadly, instead of choosing a logarithmic number of possible locations for each value, the system is configured to choose two possible locations for each value. However, if both of the possible locations are already occupied, cuckoo hashing supports eviction, i.e., one of the (previously inserted) values can be moved to an alternate location. Under this architecture, the allocation of values to locations is improved. Since the allocation uses the available locations more effectively, the system can be configured to reduce the number of values that have to be added to the client stash.

Given a positive parameter α≥0, the system sets up two hash tables HT1 and HT2, each of size (1+α)·N', where N' is the total number of values in MM2. To confirm the volume hiding property, described is the following experiment:

Let h1 and h2 be idealized hash functions that select one location at random from HT1 or HT2 for each value in a tuple. Then h1: $L' \times [t'] \rightarrow [(1+\alpha) \cdot N']$, and h2 is defined similarly.

For each label, for each value in the tuple MM2(l): using the hash functions h1 and h2, run the cuckoo hashing insertion algorithm for HT1 and HT2. If a sequence of more than log N' evictions is created during the insertion of a value, abort the insertion, and push the last evicted value to the stash In some examples, the approach leads to better utilization of space because it allows the insertion to rearrange the values, as opposed to the log choice scheme above where, if there are no empty locations available for a value, the value is always added to the client stash.

After completing the location selection for every value, add a dummy value to fill any remaining empty locations. Every location now contains exactly one value. Next, add the hash table locations and contents to two dictionaries DX1 and DX2, respectively.

Let $\Sigma_{MM}^{RH}$, $\Sigma_{DX}^{RH}$ be the response-hiding encrypted multi-map and dictionary schemes, respectively. Encrypt the multi-map MM1 and the dictionaries DX1, DX2 and output EDS=(EMM1, EDX1, EDX2).). According to some embodiments, the client stores any values that are pushed to the stash during the setup and uploads EDS to the server.

In further embodiments, queries are performed as follows: at query time, for any label l, the client first queries EMM1 to retrieve s values. The system then uses the hash functions h1(l, i) and h2(l, i), for i ∈[t'] to query 2t' locations from the encrypted dictionaries EDX1 and EDX2. Finally, the system checks the local stash for any values. Then the client decrypts the locations, and combines them with the values from the stash to retrieve the complete tuple. Similar to the log choices scheme because of how setup works, all the values in the tuple corresponding to l can be retrieved using this procedure.

Regardless of the length of the tuple MM(l), the query algorithm reads (s+2·t') encrypted values. Similar to the Log Choice embodiments, the sizes of EDX1 and EDX2 could reveal some information about the distribution of the tuple lengths in the input data. This possibility is considered as leakage. However, for any label queried, the server only sees one query to EMM1 followed by t' queries to each of EDX1 and EDX2. Further, the locations read from the dictionaries are distributed according to the ideal hash functions h1, h2. Thus, the query algorithm does not reveal the volumes of the queries made by the client.

Example Construction: Garbled Bloom Filters

According to one embodiment, as part of setup, a multi-map MM1 is constructed as described above in the Log Choice construction. For the multi-map MM2, the system implements a Garbled Bloom Filter technique to eliminate the stash on the client side. In one embodiment, given a positive parameter β≥0, the system defines a Garbled Bloom Filter GBF of size (1+β) N', where N' is the total number of values in MM2. The data structure is similar to a Bloom Filter, except each location can hold a share of a secret-shared value, instead of a single bit. To illustrate features and security of the implementation, described is the following experiment:

Let h1, h2, ... hκ be κ idealized hash functions that select one location at random from GBF for each value in a tuple. Then hi: $L' \times [t'] \rightarrow [(1+\beta) \cdot N']$, for all $1 \leq i \leq \kappa$.

For each label, for each value v in the tuple MM2 (l), find a hash function $h_\kappa$ from the set of κ hash functions such that the location $h_\kappa(l, v)$ in GBF is empty. (a shorthand for the ith location in GBF is written as GBF[i]). For any location selected by the other hash functions, $h_j(l, v)$, j≠k: if GBF $[h_j(l, v)]$ is empty, add a random share to that location.

Finally, set GBF[$h_k(l, v)$]=v⊕($\oplus_{j \neq l}$ GBF [$h_j(l, v)$]). Since now the XOR of the κ shares will result in v, this completes a valid sharing of the value v into κ locations indexed by the hash functions. In one example, The XOR operation has the following property: for any three bitstrings a; b; c; if a=b⊕c, then b=a⊕c.

After completing the sharing for every value, add random 'dummy' shares to fill any remaining empty locations in GBF. Every location in GBF now contains exactly one share. Let the locations in GBF be 1, 2, ..., (1+β)·N'. Add each location and its corresponding share to a dictionary DX.

Let $\Sigma_{MM}^{RH}$, $\Sigma_{DX}^{RH}$ be the response-hiding encrypted multi-map and dictionary schemes, respectively. The system encrypts the multi-map MM1 yielding EMM1 and the dictionary DX yielding EDX and outputs EDS=(EMM1, EDX). The client then uploads EDS to the server.

In further embodiments, queries are performed as follows: at query time, for any label l, the client first queries EMM1 to retrieve s values. The client then uses the hash functions $h_i(l, j)$, for i ∈ [κ], j ∈ [t'] to query κ·t' locations from the encrypted dictionary EDX. Then the client decrypts the shares, and for each value, it XORs the κ shares to retrieve the value. Finally, it combines the values to create the complete tuple MM(l). Regardless of the length of the tuple MM(l), the query algorithm always reads (s+κ·t') encrypted values.

As discussed above, the size of EDX could reveal some information about the distribution of the tuple lengths in the input data. This possibility is considered as leakage. However, for any label queried, the server only sees one query to EMM1 followed by κ·t' queries to EDX. The locations read from the dictionary are distributed according to the ideal hash functions $h_i$, 1≤i≤κ. Thus, the query algorithm does not reveal the volumes of the queries made by the client.

Further embodiments consider the construction and efficiency properties. According to one embodiment, the parameters β, κ of GBF can be set such that the probability of not finding an empty location for a value is negligible. Therefore, with high probability, this scheme can be implemented without the stash used in the above examples. For example, this permits stash-less implementation and improves the integration of STE and volume hiding into conventional database system, including for example, by enabling stateless implementation in conventional systems.

Various embodiments discussed provide example architecture/schemes to illustrate any of or more of the following features:

An STE scheme can leak cumulative information about the query volumes of the multi-map, while still hiding the volumes of client queries at query time. This property is used to design schemes that have smaller storage and better query complexity than the current state-of-the-art, for some input distributions.

The examples herein adapt to the input data structure and improve efficiency.

Various embodiments partition a multi-map into smaller multi-maps, and use different allocation functions for different efficiency trade-offs: (i) Random allocation, (ii) Cuckoo-hashing allocation, and (iii) Garbled Bloom Filter allocation.

Some embodiments, enable a stash-less STE scheme that hides query volumes.

Figure 3:
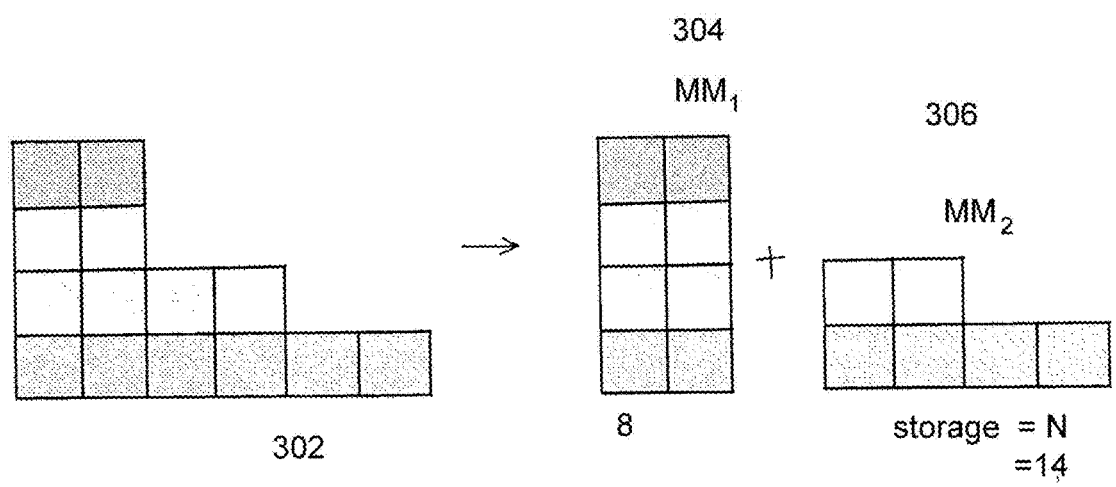
FIG. 3 is a block diagram of an example implementation, according to one embodiment.
Figure 3:
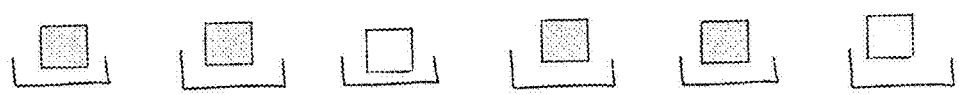

FIG. 3 illustrates a multi-map input, and the transformation of the input multi-map 302 into a first multi-map 304 and second multi-map 306. In various embodiments, the transformation into two multi-maps enables query operations that hide the query volume and, in further example, only leak the query equality. XorMM and VXorMM are known implementations (VXorMM is designed for verifiable volume hiding) thus the approaches are not entire comparable. Neither implementation realizes or exploits the trade-off between leaking response length statistics and improved efficiency that some leakage enables.

Various approaches described herein leverage greater leakage to achieve better storage for some various data distributions. Other approaches use an S4 scheme for asymptotically optimal storage and communication. The S4 approach is designed for different adversarial models that are not standard, and implements a variant of hash rings thus represents an entirely different technique from the approaches discussed herein. Other approaches include 2CH-FB and 2CH-FB-S which do not contemplate or exploit the efficiency trade-off when permitting leaking of response length statistics and therefore the approaches discussed are significantly different and improve storage and retrieval efficiency. Further examples include dprfMM and dpMM. The approaches discussed improve storage/retrieval for various data distributions when compared to dprfMM/dpMM. The schemes disclosed herein leverage additional leakage (e.g., of the shape of the input multi-map) to improve storage characteristics. Further dpMM uses a differentially private notion of security which is not comparable to models of security disclosed herein. These known approaches do not explore improved efficiency when leaking the response length statistics, making current implementation significantly different. VLH and AVLH are other examples that provide optimal storage and communication complexity. However, the VLH approach defines a "lossy" scheme (e.g., a scheme which makes errors on query with some probability). The current disclosure provides examples and implementation that achieve correct operation. When compared, for example, to AVLH, the disclosed examples leverage additional leakage to provide improved storage and communication complexity for various data distributions. In further example, AVLH uses a random allocation, however AVLH does not explore trade-offs when leaking the response length statistics, and therefore the disclosed schemes are significantly different. While these various approaches above are available, the present implementation and various examples have better storage and/or communication complexity by leveraging leaking the shape of the input multi-map for various data distributions.

In other embodiments, various ones of the functions and/or portions of the flows discussed herein can be executed in different order. In still other embodiments, various one of the functions and/or portions of the flow can be omitted, or consolidated. In yet other embodiments, various one of the functions and/or portions of the flow can be combined, and used in various combinations of the disclosed flows, portions of flows, and/or individual functions. In various examples, various one of the screens, functions and/or algorithms can be combined, and can be used in various combinations of the disclosed functions.

Various approaches exist that address volume-hiding, however, the known approaches do not consider the trade-off between leaking some volume information and the ability to achieve improved efficiency in storage and retrieval, among other differences.

Figure 4:
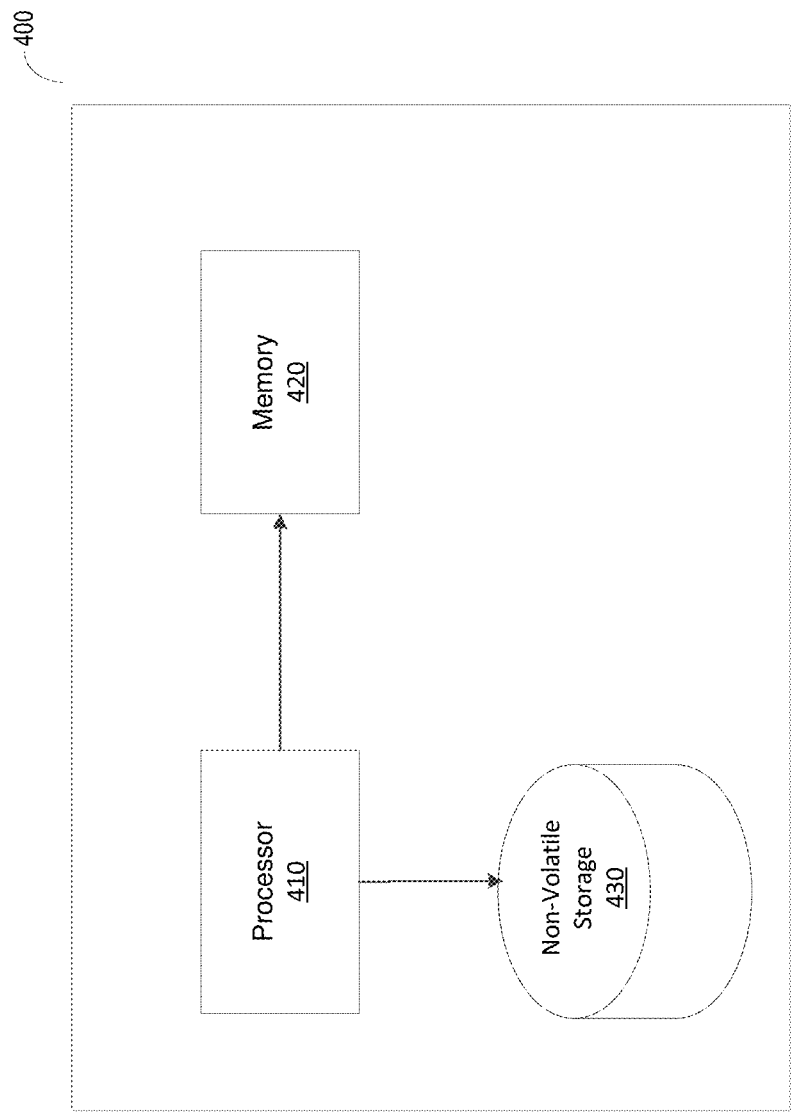
FIG. 4 is a block diagram of an example computer system improved by implementation of the functions, operations, and/or architectures described herein.

FIG. 4 is a block diagram of an example computer system 400 that is improved based on execution and/or implementation of the functions, operations, and/or architectures described herein. Modifications and variations of the discussed embodiments will be apparent to those of ordinary skill in the art and all such modifications and variations are included within the scope of the appended claims. Additionally, an illustrative implementation of a computer system 400 that may be improved when used in connection with any of the embodiments of the disclosure provided herein is shown in FIG. 4. The computer system 400 may include one or more processors 410 and one or more articles of manufacture that comprise non-transitory computer-readable storage media (e.g., memory 420 and one or more non-volatile storage media 440). The processor 410 may control writing data to and reading data from the memory 420 and the non-volatile storage device 430 in any suitable manner. To perform any of the functionality described herein (e.g., image reconstruction, anomaly detection, etc.), the processor 410 may execute one or more processor-executable instructions stored in one or more non-transitory computer-readable storage media (e.g., the memory 420), which may serve as non-transitory computer-readable storage media storing processor-executable instructions for execution by the processor 410.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein. Some example STE schemes are discussed in co-pending U.S. Patent Publication No. 2022/0207171, published on Jun. 30, 2022, which is incorporated herein by reference in its entirety.

Processor-executable instructions may be in many forms, such as program modules, executed by one or more computers or other devices. Generally stated, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples (e.g., the processes described herein) have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

In other embodiments, various ones of the functions and/or portions of the flows discussed herein can be executed in different order. In still other embodiments, various one of the functions and/or portions of the flow can be omitted, or consolidated. In yet other embodiments, various one of the functions and/or portions of the flow can be combined, and used in various combinations of the disclosed flows, portions of flows, and/or individual functions. In various examples, various one of the screens, functions and/or algorithms can be combined, and can be used in various combinations of the disclosed functions.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

All definitions, as defined and used herein, should be understood to control over dictionary definitions, and/or ordinary meanings of the defined terms. As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A volume hiding encryption system comprising:
   at least one processor operatively connected to a memory, the at least one processor when executing, is configured to:
   execute setup operations on an input multi-map data structure;
   transform the input multi-map data structure into at least two multi-map data structures as part of the setup operations, wherein the operation to transform includes an operation to generate a minimum number of encrypted values based on at least one characteristic of one or more tuples in the input multi-map;
   encrypt the at least two multi-map data structures;
   store the encrypted form of the at least two multi-map data structures for executing queries; and
   execute queries on the encrypted form of the at least two multi-map data structures, wherein execution of each query reads a system defined number of encrypted values irrespective of a length of a tuple stored in the input multi-map.

2. The system of claim 1, wherein the system defined number is a fixed number.

3. The system of claim 1, wherein the operation to generate the minimum number of encrypted values based on at least one characteristic of one or more tuples in the input multi-map includes an operation to generate the minimum number of encrypted values based on at least a minimum length of a tuple in the input multi-map.

4. The system of claim 1, wherein the operation to transform the input multi-map data structure into at least two multi-map data structures as part of the setup operations includes an operation to build a first multi-map storing a first set of values from every tuple in the input multi-map for tuple values up to a minimum response length.

5. The system of claim 4, wherein the at least one processor is configured to construct a second multi-map storing tuple values for tuples exceeding a minimum response length.

6. The system of claim 5, wherein the at least one processor is configured to assign storage locations in the second multi-map based on logarithmic choice for the storage location.

7. The system of claim 5, wherein the at least one processor if configured to assign storage locations in the multi-map data structure based on cuckoo-hashing allocation or garbled bloom filter allocation.

8. The system of claim 5, wherein the at least one processor is configured to assign dummy values to any empty storage locations in the second multi-map.

9. The system of claim 4, wherein the at least one processor is configured to store any excess values in a stash repository responsive to identifying allocated locations.

10. The system of claim 4, wherein the at least one processor is configured to generate an encrypted dictionary storing the storage location labels and contents.

11. The system of claim 1, wherein a first one of the at least two multi-map data structures is constructed based on a consistent size tuple, and the second one of the at least two multi-map data structures is constructed to include at least some values that store data exceeding the consistent size of the first multi-map data structure.

12. The system of claim 1, wherein the at least one processor is configured to execute queries to include at least operations to:
retrieve encrypted values from the first one of the at least two multi-map data structures; and
obscure a volume associated with a client query based on retrieving encrypted values from an encrypted dictionary needed to reconstruct a plaintext query response at the client.

13. The system of claim 1, wherein the at least one processor is configured to store the encrypted form of the at least two multi-map data structures for executing queries without requiring a stash for excess values.

14. A computer implemented method for volume hiding encryption, the method comprising:
executing, by the at least one processor, setup operations on an input multi-map data structure;
transforming, by the at least one processor, the input multi-map data structure into at least two multi-map data structures as part of the setup operations, wherein transforming includes generating a minimum number of encrypted values based on at least one characteristic of one or more tuples in the input multi-map;
encrypting, by the at least one processor, the at least two multi-map data structures;
storing, by the at least one processor, the encrypted form of the at least two multi-map data structures for executing queries; and
executing, by the at least one processor, queries on the encrypted form of the at least two multi-map data structures, wherein the act of executing for each query reads a system defined number of encrypted values irrespective of a length of a tuple stored in the input multi-map.

15. The method of claim 14, wherein the system defined number of encrypted values is a fixed number for a given input multi-map.

16. The method of claim 14, wherein generating the minimum number of encrypted values based on at least one characteristic of one or more tuples in the input multi-map includes generating a minimum number of encrypted values based on at least a minimum length of a tuple in the input multi-map.

17. The method of claim 16, wherein transforming includes generating a second multi-map storing tuple values for tuples exceeding a minimum response length.

18. The method of claim 14, wherein transforming the input multi-map data structure into at least two multi-map data structures as part of the setup operations includes generating a first multi-map storing a first set of values from every tuple in the input multi-map for tuple values up to a minimum response length.

19. The method of claim 18, wherein generating the second multi-map includes assigning storage locations in the second multi-map based on logarithmic choice for the storage location.

20. The method of claim 14, wherein the method further comprises assigning storage locations in the multi-map data structure based on cuckoo-hashing allocation or garbled bloom filter allocation.

* * * * *